June 29, 1943.  A. RABL  2,322,969
HUB-OPERATED DYNAMO FOR BICYCLES
Filed Jan. 30, 1940
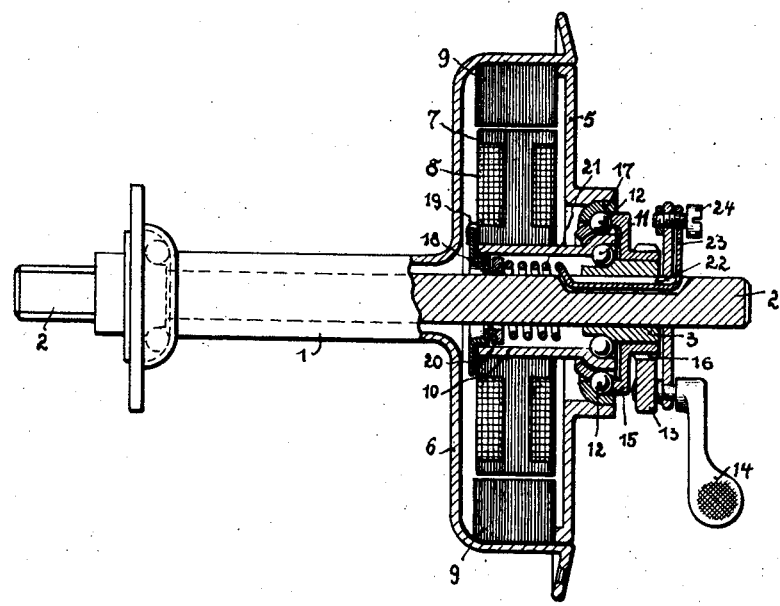
Inventor:
Alfred Rabl Patented June 29, 1943

2,322,969

UNITED STATES PATENT OFFICE 2,322,969

HUB-OPERATED DYNAMO FOR BICYCLES

Alfred Rabl, Wiener-Neudorf, Germany; vested in the Alien Property Custodian

Application January 30, 1940, Serial No. 316,438
In Germany February 10, 1939

1 Claim. (Cl. 74—281)

Hub operated dynamos for bicycles are known, in which a roller gear is used to drive the armature and magnetic field of the dynamo in opposite direction of rotation. It is also known in the case of hub operated dynamos to provide a disengaging gear for disconnecting the drive of the dynamo. The known hub operated dynamos require a very large space and are too heavy in weight.

According to the invention, the roller gear runs on a roller bearing. The rolling members of the roller gear are suitably arranged between a member carrying the magnet and a sleeve carrying the armature and running on a roller bearing. The result is a considerable simplification in design permitting of a compact construction, thus it is possible to lessen the dimensions of the dynamo and reduce the cost of production.

The object of invention is shown, by way of example, in the annexed drawing, partly as a sectional view.

The dynamo is housed in the enlarged portion 6 of the hub 1. The magnet 9 is secured to member 6, whilst the armature 7 is mounted with its winding 8 on the sleeve 10. This sleeve is supported unilaterally by the balls 11 of the roller bearing and carries the balls 12 of the roller gear. The balls 11 run on a bearing ring 3 secured to the stationary axle 2. The balls 12 are held in position by the ball bearing cage 15 provided with a toothed rim 16 with which a pawl 13 may be caused to engage from the handle 14 to throw in the gear. The ring 17 resting on the balls 12 is secured to the cover 5 of the machine.

If by means of the handle 14 the pawl 13 is caused to engage the teeth 16 of the ball bearing cage 15, the balls 12 are turned round as the hub 1 rotates, these balls driving the bearing ring 10 and thereby the armature 7 in opposite direction at an increased speed.

For the collection of current from the revolving armature a slip ring 18 is fastened to the armature and insulated, this slip ring being electrically connected with the end 19 of winding 8. A contact disc 20 is forced against the slip ring 18 by a spring 21 encircling the stationary axle 2 and being passed through a recess 22 of the axle. The end 23 of the spring is connected with the terminal screw 24 from which the current is taken. Spring 21 and slip ring 20 are so arranged as not to get into contact with the stationary axle and sleeve.

I claim:

A gear drive for dynamos carried by bicycles of the type including a wheel hub, comprising a sleeve carrying a dynamo element, a ball bearing between the sleeve and hub, a ball gear for driving the sleeve, said ball gear including a ball-carrying cage having an externally-toothed extension surrounding the hub, and manually-operable means to cooperate with the teeth of the extension to selectively fix or free the ball gear relative to the hub, the balls of the bearing and the balls of the ball gear being in a vertical plane transverse the wheel hub.

ALFRED RABL.